(12) United States Patent
Moran Saavedra et al.

(10) Patent No.: US 11,368,291 B2
(45) Date of Patent: *Jun. 21, 2022

(54) MUTUALLY AUTHENTICATED ADAPTIVE MANAGEMENT INTERFACES FOR INTERACTION WITH SENSITIVE INFRASTRUCTURE

(71) Applicant: Microsoft Technology Licensing, LLC, Redmond, WA (US)

(72) Inventors: Armando Moran Saavedra, Redmond, WA (US); Daniel Pravat, Redmond, WA (US); Filippo Seracini, Redmond, WA (US); Lee Holmes, Redmond, WA (US); Alexandru Naparu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/901,642

(22) Filed: Jun. 15, 2020

(65) Prior Publication Data
US 2020/0313876 A1    Oct. 1, 2020

Related U.S. Application Data

(63) Continuation of application No. 15/911,069, filed on Mar. 2, 2018, now Pat. No. 10,686,596.

(Continued)

(51) Int. Cl.
*H04L 9/08* (2006.01)
*H04L 9/32* (2006.01)
(Continued)

(52) U.S. Cl.
CPC ........... *H04L 9/0825* (2013.01); *G06F 21/00* (2013.01); *H04L 9/3226* (2013.01);
(Continued)

(58) Field of Classification Search
CPC ... H04L 9/0825; H04L 9/3226; H04L 9/3297; H04L 63/0428; H04L 63/06;
(Continued)

(56) References Cited

U.S. PATENT DOCUMENTS

9,214,609 B2 ‡ 12/2015 Bechtel .................. H01L 33/44
9,594,898 B2 ‡  3/2017 Beauregard ............ G06F 9/468
(Continued)

*Primary Examiner* — Christopher A Revak
(74) *Attorney, Agent, or Firm* — Workman Nydegger (57) ABSTRACT

An interface, through which functionality of a cloud computing infrastructure can be accessed, can create defined endpoints through which such an interface is accessed, with such defined endpoints limiting the functionality accessible through the interface to only allowed functions. An elevate function can, through a secure key exchange protocol, receive appropriate assurances and can, in response, remove the functionality limitations of the endpoint, thereby enabling unfettered access to the cloud computing infrastructure. Such unrestricted access can be limited in duration, which duration can be established in advance, or agreed-upon through the key exchange mechanism.

20 Claims, 6 Drawing Sheets

Related U.S. Application Data (60) Provisional application No. 62/637,383, filed on Mar. 1, 2018.

(51) Int. Cl.
*G06F 21/00* (2013.01)
*H04L 9/40* (2022.01)

(52) U.S. Cl.
CPC ........ *H04L 9/3297* (2013.01); *H04L 63/0428* (2013.01); *H04L 63/06* (2013.01); *H04L 63/0442* (2013.01)

(58) Field of Classification Search
CPC .............. H04L 63/0442; H04L 9/0861; H04L 9/0891; H04L 9/3228; G06F 21/00; G06F 21/335; G06F 21/629
See application file for complete search history.

(56) References Cited

U.S. PATENT DOCUMENTS

| | | | |
|---|---|---|---|
| 9,641,544 B1 ‡ | 5/2017 | Treat | H04L 63/1425 |
| 9,740,543 B1 ‡ | 8/2017 | Savage | G06F 9/4486 |
| 10,257,263 B1 ‡ | 4/2019 | Wagner | H04L 63/083 |
| 10,270,754 B2 * | 4/2019 | Sato | H04L 63/08 |
| 10,333,797 B2 ‡ | 6/2019 | Wang | H04L 41/26 |
| 10,362,108 B2 ‡ | 7/2019 | Boss | H04W 28/22 |
| 10,686,596 B2 * | 6/2020 | Moran Saavedra | H04L 63/06 |
| 2008/0098478 A1 ‡ | 4/2008 | Vaidya | G06F 21/34 726/24 |
| 2009/0091791 A1 * | 4/2009 | Ferlitsch | H04N 1/00344 358/1.15 |
| 2015/0281322 A1 * | 10/2015 | Dingwell | G06F 9/45558 705/26.82 |
| 2016/0127539 A1 * | 5/2016 | Sharma | H04M 15/08 379/112.09 |
| 2017/0329957 A1 ‡ | 11/2017 | Vepa | G06F 21/445 |
| 2021/0117566 A1 * | 4/2021 | Kajava | H04L 9/3234 |

\* cited by examiner
‡ imported from a related application

MUTUALLY AUTHENTICATED ADAPTIVE MANAGEMENT INTERFACES FOR INTERACTION WITH SENSITIVE INFRASTRUCTURE

CROSS-REFERENCE TO RELATED APPLICATION

This application is a continuation of and claims priority to U.S. patent application Ser. No. 15/911,069, filed on Mar. 2, 2018 and entitled "MUTUALLY AUTHENTICATED ADAPTIVE MANAGEMENT INTERFACES FOR INTERACTION WITH SENSITIVE INFRASTRUCTURE", which further claims priority to U.S. Provisional Patent Application Ser. No. 62/637,383, filed on Mar. 1, 2018 and entitled "DOUBLE SECURED GRANTING OF TEMPORARY ELEVATED ACCESS TO SEALED INFRASTRUCTURE", each of which are hereby incorporated by reference in their entirety.

BACKGROUND

An increasingly popular channel for delivering computing functionality is so-called "cloud computing", whereby computer hardware and associated support hardware, such as power supplies, fans, and building infrastructure are maintained by a third-party and access to such computing hardware is made available through network communications. More specifically, the capabilities of such computing hardware are abstracted and offered to many different end-users through cloud computing infrastructure that exposes various services and functionality the network communications. In some instances, it can be desirable for entities to purchase and directly maintain their own computing hardware, but still take advantage of network based cloud computing, such as, for example, to enable systems and tools, that were originally designed to execute on such cloud computing models, to also execute on computing hardware that is directly maintained by the entity. In such instances, cloud computing infrastructure can be installed on the computing hardware purchased and maintained by individual entities. For security such cloud computing infrastructure is sealed. The creator or manufacture of such cloud computing infrastructure is not provided with unfettered access because such unfettered access may violate individual entities' security policies. Similarly, the individual entities may not be provided with unfettered access since such unfettered access can be undesirable to the creator or manufacturer of such cloud computing infrastructure. Unfortunately, failures can occur that can require unfettered access to the functions and capabilities of such otherwise sealed cloud computing infrastructure. Absent a mechanism to provide such unfettered access in a secure manner, such failures were unrecoverable, requiring a complete reinstallation of the cloud computing infrastructure.

SUMMARY

An interface, through which functionality of a cloud computing infrastructure can be accessed, can create defined endpoints through which such an interface is accessed, with such defined endpoints limiting the functionality accessible through the interface to only allowed functions. An elevate function can, through a secure key exchange protocol, receive appropriate assurances and can, in response, remove the functionality limitations of the endpoint, thereby enabling unfettered access to the cloud computing infrastructure. One such secure key exchange protocol can cause the elevate function to utilize a pre-stored public key to encrypt a package comprising a newly generated public key and transmit such an encrypted package, as a request token, to a remotely executing process associated with, or controlled by, the manufacturer or creator of the cloud computing infrastructure. The remotely executing process can utilize the newly generated public key to encrypt response data such that it can only be decrypted by the elevate function having access to the newly generated private key. Such a response token can act as evidence of a dual-party authentication, and the elevate function can remove the restrictions associated with the endpoint through which the interface into the functionality of the cloud computing infrastructure was accessed, thereby enabling unrestricted access. Such unrestricted access can be limited in duration, which duration can be established in advance, or agreed-upon through the key exchange mechanism.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the removing of access restrictions and allowing greater access to the functionality of an otherwise sealed cloud infrastructure. More specifically, an interface, through which functionality of a cloud computing infrastructure can be accessed, can create defined endpoints through which such an interface is accessed, with such defined endpoints limiting the functionality accessible through the interface to only allowed functions. An elevate function can, through a secure key exchange protocol, receive appropriate assurances and can, in response, remove the functionality limitations of the endpoint, thereby enabling unfettered access to the cloud computing infrastructure. One such secure key exchange protocol can cause the elevate function to utilize a pre-stored public key to encrypt a package comprising a newly generated public key and transmit such an encrypted package, as a request token, to a remotely executing process associated with, or controlled by, the manufacturer or creator of the cloud computing infrastructure. The remotely executing process can utilize the newly generated public key to encrypt response data such that it can only be decrypted by the elevate function having access to the newly generated private key. Such a response token can act as evidence of a dual-party authentication, and the elevate function can remove the restrictions associated with the endpoint through which the interface into the functionality of the cloud computing infrastructure was accessed, thereby enabling unrestricted access. Such unrestricted access can be limited in duration, which duration can be established in advance, or agreed-upon through the key exchange mechanism.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
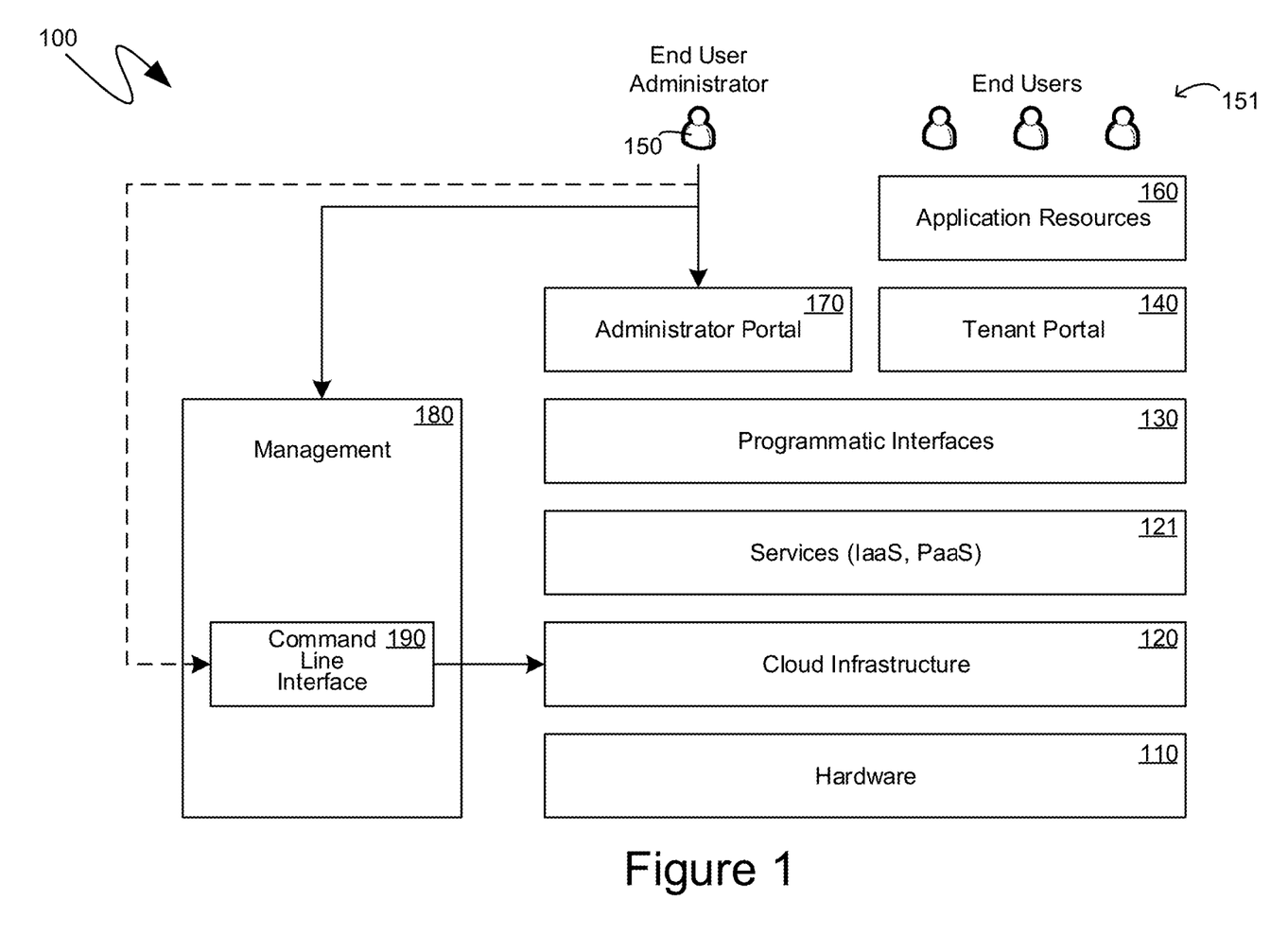
FIG. 1 is a system diagram of an exemplary system that provides access to otherwise sealed cloud infrastructure functionality.

With reference to FIG. 1, an exemplary system 100 is illustrated, whereby an end-user administrator, such as the exemplary end-user administrator 150, can maintain hardware and software providing for locally hosted cloud infrastructure. More specifically, the hardware, such as the exemplary hardware 110, can have executing upon it cloud infrastructure, such as the exemplary cloud infrastructure 120, that can act as a host for software providing services 121 such as Infrastructure as a Service (IaaS) and Platform as a Service (PaaS), which can provide host operating systems, development tools, database management, and the like. Although illustrated as separate from the cloud infrastructure 120, the services layer 121 can sometimes be considered as part of the cloud infrastructure 120. The functionality provided by the cloud infrastructure 120, including the functionality provided by the services layer 121, can be exposed through programmatic interfaces, such as the exemplary programmatic interfaces 130, which can be utilized by application resources, such as the exemplary application resources 160. The application resources 160 can include virtual machines, virtual networks, websites, storage blobs, service fabric clusters, and other like application resources. Often, a tenant portal, such as the exemplary tenant portal 140, or other like graphical interface, is provided to facilitate the setup and utilization of the application resources 160, including facilitating the utilization of the exposed programmatic interfaces 130 by such application resources 160.

The end-user administrator 150 can utilize management functionality, such as the exemplary management functionality 180 to set up, troubleshoot, and otherwise manage the cloud infrastructure 120 on the hardware 110 that is also managed by such an end-user administrator 150, or is otherwise owned and operated by, or on behalf of, an entity employing such an end-user administrator 150. According to one aspect, the management of such resources can be performed through an administrator portal, such as the exemplary administrator portal 170, or other like user interface, through which the end-user administrator 150 can access, through the exposed programmatic interfaces 130, the functionality provided by the cloud infrastructure 120. Alternatively, or in addition, an end-user administrator 150 can also have access to management functionality 180 more directly, potentially providing greater or more precise access to aspects of the cloud infrastructure 120 than the administrator portal 170, which can, in such an instance, provide a more simplified, easy to use interface. In certain situations, it may be necessary for an end-user administrator 150 to directly execute functions provided by the cloud infrastructure 120. A command line interface, scripting interface or other like interface, such as the exemplary command line interface 190, can be provided as part of the management functionality 180 through which the could infrastructure 120 can be managed and accessed by the end-user administrator 150. Typically, access to a command line interface 190 can be obtained through a remote instance thereof. For security, such a remote instance can allow access to only limited functionality, such as by limiting the functions that the end-user administrator 150 can execute to only allowed functions.

Figure 2:
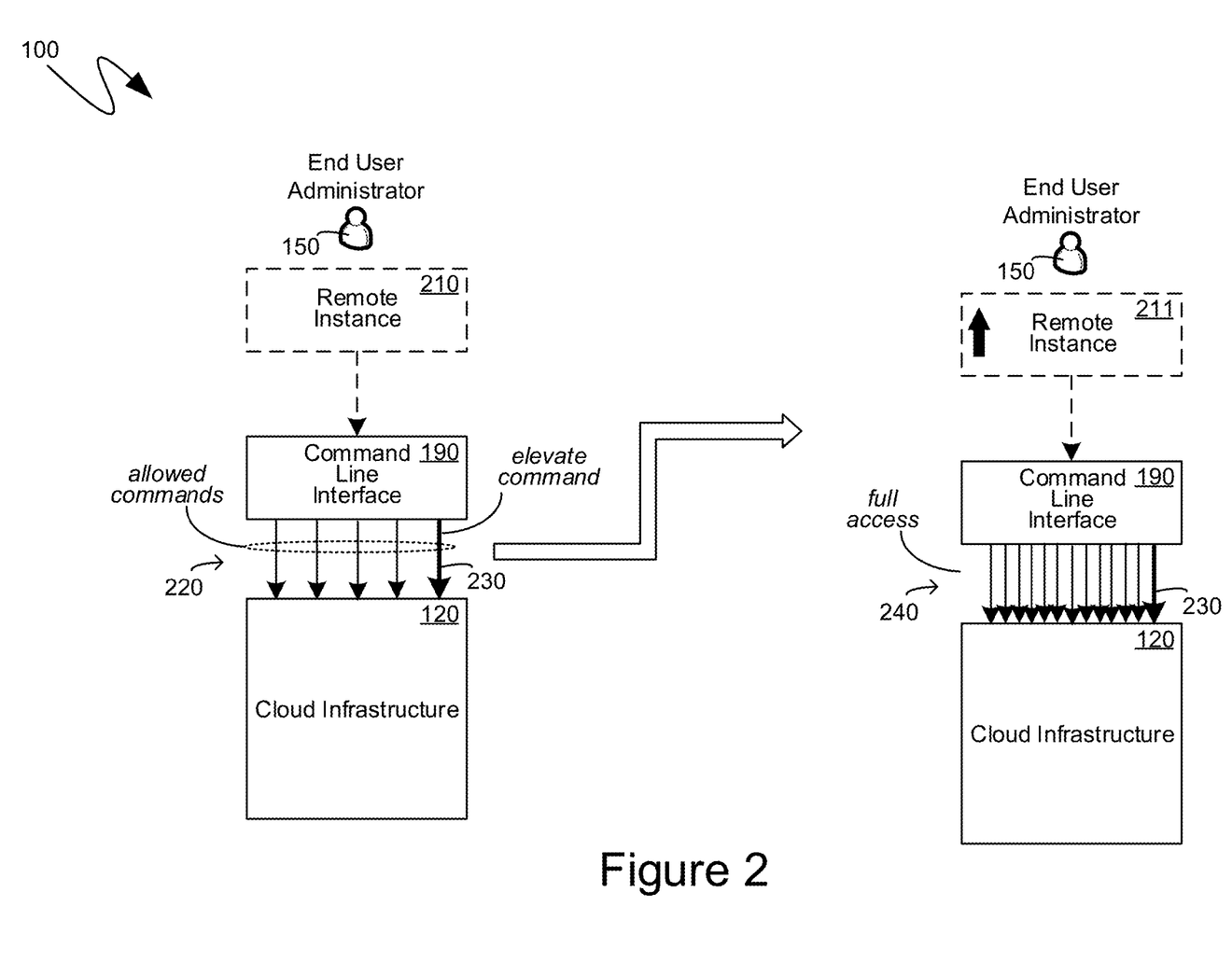
FIG. 2 is a block diagram of an exemplary provision of access to otherwise sealed cloud infrastructure functionality.

Turning to FIG. 2, the system 200 shown therein illustrates an end-user administrator, such as the exemplary end-user administrator 150, instantiating a remote instance 210 of the command line interface 190 to allow the end user administrator 150 to execute, through the command line interface 190, commands enabled by, or supported by, the cloud infrastructure 120. One mechanism for establishing a remote instance, such as the exemplary remote instance 210, is to establish a virtual machine, such as supported by the cloud infrastructure, that the end-user administrator 150 can create an account on and remotely login to such an account and execute the command line interface 190 within such an account. As indicated, for security, the commands or functions which are allowed to be invoked or executed through such a remote instance 210 can, initially, be limited to only specific commands or functions, known as allowed commands or functions. More specifically, the command line interface 190 can allow for the definition of endpoints through which the command line interface 190 can be accessed, and, the definition of such endpoints can include an explicitly delineated limit on the functionality of the command line interface 190. For example, such explicitly delineated limits can enumerate only specific commands, functions, scripts or other like functional invocations can be successfully invoked through the command line interface 190 when the command line interface 190 is accessed through the defined endpoint. A specific endpoint can execute under the context of a particular user, such as, for example, the remote instance 210 illustrated in FIG. 2. Thus, when the end-user administrator 150 instantiates the remote instance 210 through which to access the command line interface 190, such an instantiation can be performed within the context of a particular endpoint, which can constrain the accessible functionality to only previously defined allowed commands, such as the exemplary while listed commands 220.

To allow access to greater functionality, the remote instance 210 can be elevated such that full administrator access can be granted and the commands and functions accessible through, for example, the command line functionality, can include sensitive commands that were previously not allowed and, thus, not able to be invoked through the remote instance. More specifically, the remote instance 210 can be elevated from executing within the context of a non-administrator user to an administrator user, and the endpoint-defined restrictions can be removed. According to one aspect, a command to elevate the remote instance, such as the exemplary elevate command 230, can be one of the allowed commands 220 that the command line interface 190 is allowed to invoke. Invocation of such an elevate command 230 can, ultimately, result in the remote instance being elevated and, thereby, having, through the command line interface 190, full administrative access to all of the commands and functions, or a greater subset of the commands and functions that are supported by, and provided by, the cloud infrastructure 120. More specifically, invocation of the elevate command 230 can trigger the generation of a request token, which can be displayed to the end-user administrator 150 via the remote instance 210. Additionally, an input mechanism can be displayed to the end user administrator 150, again, through the remote instance 210, to enable the end user administrator 150 to enter a response token. Upon verification of the response token, the elevate command 230 can elevate the remote instance to an elevated remote instance 211 and the endpoint-defined restrictions can be removed, thereby enabling access to commands and resources that are sensitive and to which access is otherwise restricted, such as the exemplary full access 240. However, providing individual end-user administrators unrestricted administrator access to the cloud infrastructure can be undesirable to the developer or creator of such cloud infrastructure. Similarly, for security purposes, the entities that utilize such cloud infrastructure can be uncomfortable with the developer or creator of such cloud infrastructure having unilateral administrator access.

Figure 3:
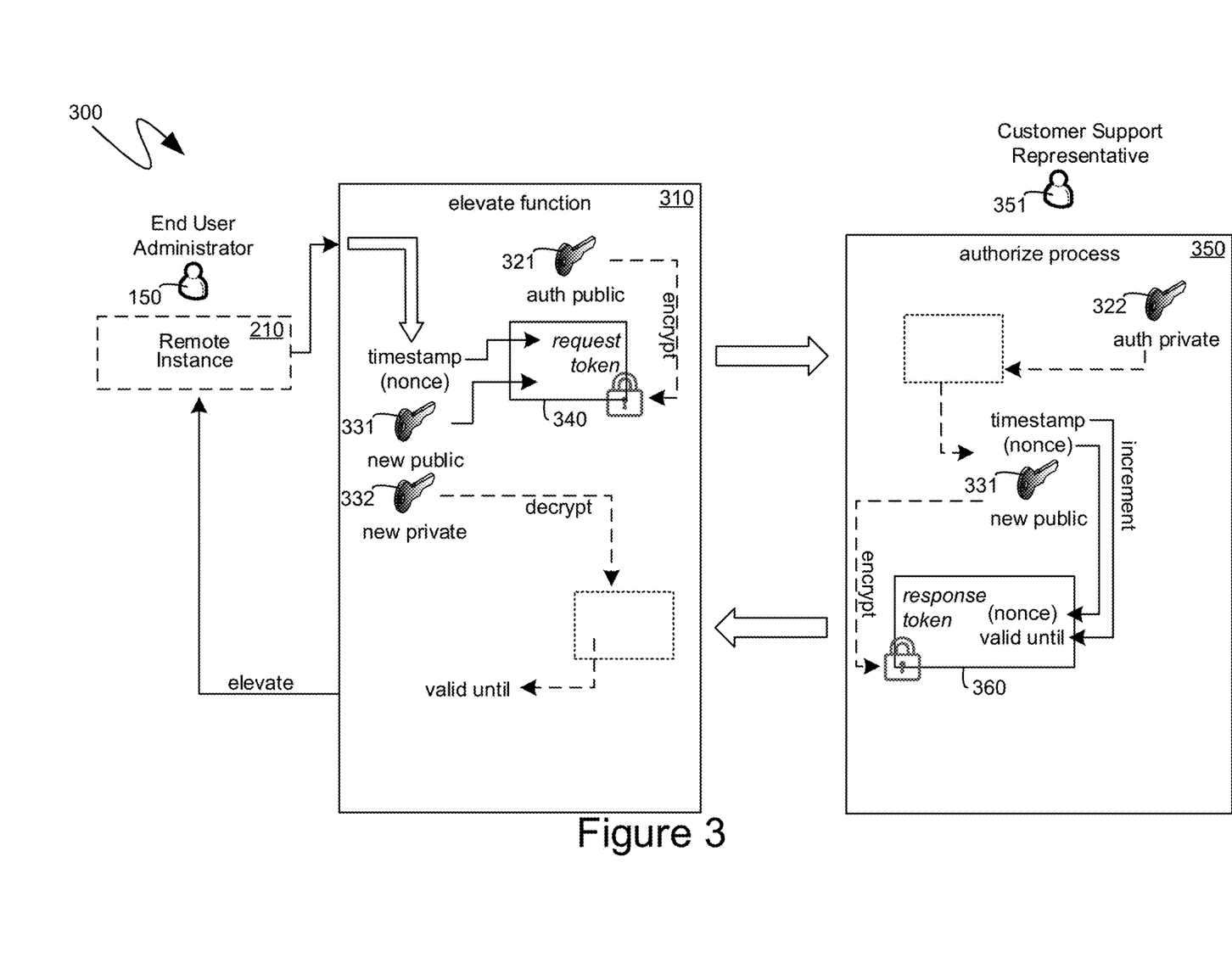
FIG. 3 is a block diagram of an exemplary key exchange mechanism.

Turning to FIG. 3, the system 300 shown therein illustrates exemplary mechanisms by which cooperation by both end-user administrators, acting on behalf of an entity implementing cloud infrastructure on their own computing hardware, and customer support representatives, acting on behalf of the developer or creator of such cloud infrastructure, can be, for security purposes, a required precondition to provide administrator access. According to one aspect, an end user administrator, such as the exemplary end user administrator 150, can instantiate a remote instance 210 of a command line interface through a predefined endpoint of such a command line interface. As detailed previously, such a predefined endpoint can limit the functionality accessible through such a command line interface. One function, or command, that can be allowed by the endpoint can be an elevate function, such as the exemplary elevate function 310, that can elevate the remote instance to such unfettered administrator access. Elevate function 310 is provided a different identifying number in FIG. 3 than the afore-identified elevate function 230 in FIG. 2 to signify the different graphically illustrated aspects of such an elevate function. The elevate function 310 can have access to a public key that can have been preinstalled, or can have been pre-stored, as part of the development and construction of the cloud infrastructure. For ease of reference, such a public key will be referred to as an "authorization public key", such as the exemplary authorization public key 321. The authorization public key 321 can have a corresponding authorization private key 322 that can be maintained by the developer or creator of the cloud infrastructure in a secure manner such that it is not shared with other entities. With access to such an authorization public key 321, the elevate function 310 can encrypt data that can only be decrypted by processes that can be allowed by the developer or creator of the cloud infrastructure to have access to the authorization private key 322, such as the exemplary authorize process 350 illustrated in FIG. 3. For security, such an authorize process 350 can execute on computing devices maintained exclusively by or on behalf of the developer or creator of the cloud infrastructure, and which can be otherwise un-accessible to end-users.

According to one aspect, the elevate function 310 can generate a new public/private key pair, referred to hereinafter as the "newly generated public key", such as the exemplary newly generated public key 331 and "newly generated private key", such as the exemplary newly generated private key 332. The elevate function 310 can generate new public/private key pairs each time a remote instance, such as the exemplary remote instance 210, seeks to elevate and be allowed administrator, or unrestricted, access. Additionally, the elevate function 310 can also record a current time in a timestamp, as well as, optionally, generate a nonce. Subsequently, the elevate function can encrypt the timestamp, optional nonce, and the newly generated public key 331 with the authorization public key 321 that was previously generated and distributed as part of, for example, the cloud infrastructure itself to generate a request token, such as the exemplary request token 340. Although not explicitly illustrated in FIG. 3, a request token, such as the exemplary request token 340, can also include other data like when was the last time the system was unlocked, a deployment identifier, and other like data.

The request token, such as the exemplary request token 340, can then be transmitted to an authorize process, such as the exemplary authorize process 350, which, as indicated previously, can execute on remote computing devices that the end-user is prevented from directly accessing. According to one aspect, the request token 340 can be displayed, such as in the form of a multi-character alphanumeric string, to the end-user administrator via the remote instance 210 of the command line interface. The end-user administrator can then manually transmit the request token to an authorize process, such as the exemplary authorize process 350. Such a manual transmission can entail the cutting-and-pasting of the request token 340 into an instant message, email message, text message, or other like communicational mechanism, from which a customer support representative can obtain the request token 340 and then subsequently manually enter it into the authorize process 350. Alternatively, the elevate function 310 can automatically transmit the request token 340 directly to the authorize process 350.

Once received by the authorize process 350, the authorization private key 322 can be utilized to decrypt the request token 340. If the authorization private key 322 can properly decrypt the request token 340, such a proper decryption can be a verification that the request token 340 was, in fact, encrypted with the authorization public key 321, and is, therefore, proper. Upon decrypting the request token 340, the authorize process 350 can then have access to the content contained therein including, for example, the timestamp, the optional nonce, and the newly generated public key 331. According to one aspect, the timestamp can be incremented by a predetermined amount, such as a predetermined quantity of minutes, hours, days, or any other like predetermined quantity of time, and the resulting time can be a "valid until" time which can limit administrator access only until such a time is reached. A response token, such as the exemplary response token 360 can be generated by encrypting the valid until time and the optional nonce utilizing the newly generated public key 331 that was obtained from the decrypting of the request token 340. Alternatively, the request token 340 can comprise both a timestamp and a subsequent, or valid until, time. In such an instance, the response token 360 can include both the timestamp and valid until time, or can just include, as a whole, the request token itself 340. Once generated, the response token 360 can then be returned to the elevate function 310. According to one aspect, the response token 360 can be provided directly to the elevate function 310, such as through a port, interface, or other like communicational endpoint configured to receive such response tokens. For example, an address, or other like communicational identifier, of such a communicational endpoint can be identified as part of the transmission of the request token 340, thereby enabling the response token 360 to be directed to that communicational endpoint. According to another aspect, the response token 360 can be provided to a customer support representative, such as the exemplary customer support representative 351, through a user interface exposed by the authorize process 350, or interfacing with the authorize process 350, and the customer support representative 351 can provide the response token 360 to the end-user administrator 150, such as by cutting-and-pasting the response token into a communicational message directed to the end-user administrator 150. The end-user administrator 150 can then enter the response token 360 into an interface exposed by the elevate function 310 through the remote instance 210. For example, upon generating the request token 340, the elevate function 310 can present an input mechanism through which it can await the end-user administrator's entry of the response token 360.

Upon receipt of the response token 360, the elevate function 310 can then utilize in the newly generated private key 332 to decrypt the response token 360. If the response token 360 is able to be properly decrypted with the newly generated private key 332, such a proper decryption can be a verification that the response token 360 was properly generated in response to the request token 340, which conveyed the newly generated public key 331 used to properly generate the response token 360. Such a verification can then be a trigger to the elevate function 310 to elevate the remote instance 210 to allow for the aforementioned administrator, or unrestricted, access. Additionally, according to one aspect, the valid until time can be referenced by the elevate function 310 such that, upon such a valid until time being reached, the elevation of the remote instance 210 is revoked and access is returned to the previously described whitelisted functions and commands.

To provide additional security, the entry of the request token 340 into the authorize process 350, or the subsequent processing of the request token 340 by the authorize process 350, can be triggered by, or otherwise limited by, explicit human input, such as in the manner detailed above. In such an instance, brute force, dictionary, or other like attacks that rely on computing devices' abilities to quickly process large quantities of input data, can be detected and neutralized.

Similarly, to provide additional security, the entry of the response token 360 into the elevate function 310 can also be triggered by, or otherwise limited by, explicit human input. According to one aspect, the invocation of the elevate function 310 can be secured so that, for example, individuals or entities with access to the authorize process 350 cannot themselves independently trigger the elevate function 310, thereby gaining unfettered access without the knowledge of, for example, the end user administrator 150. In such an aspect, the end user administrator 150 can be allowed to set a password to protect the initial triggering of the elevate function 310, with the elevate function 310 subsequently requiring such a password before the mechanisms detailed above are performed.

In some instances, administrator access can be required when the management layer or other like functionality has failed in such a manner that only limited access, such as through a directly connected keyboard and monitor, can be achieved. In such instances, alternative public/private keys can be utilized to encrypt the request token 340 and the corresponding response token 360 to result in numerically fewer digits, since each individual digit will be required to be separately transcribed, such as by the end-user administrator 150, given the failure of underlying functionality limiting such end-user administrator's access to directly connected keyboards, or other like limited functionality devices. For example, the request and response tokens described above can be standard cryptographic messages encoded in Base64. By contrast, request and response tokens having numerically fewer digits can utilize different encoding schemes, and other mechanisms to reduce the quantity of digits.

Figure 4:
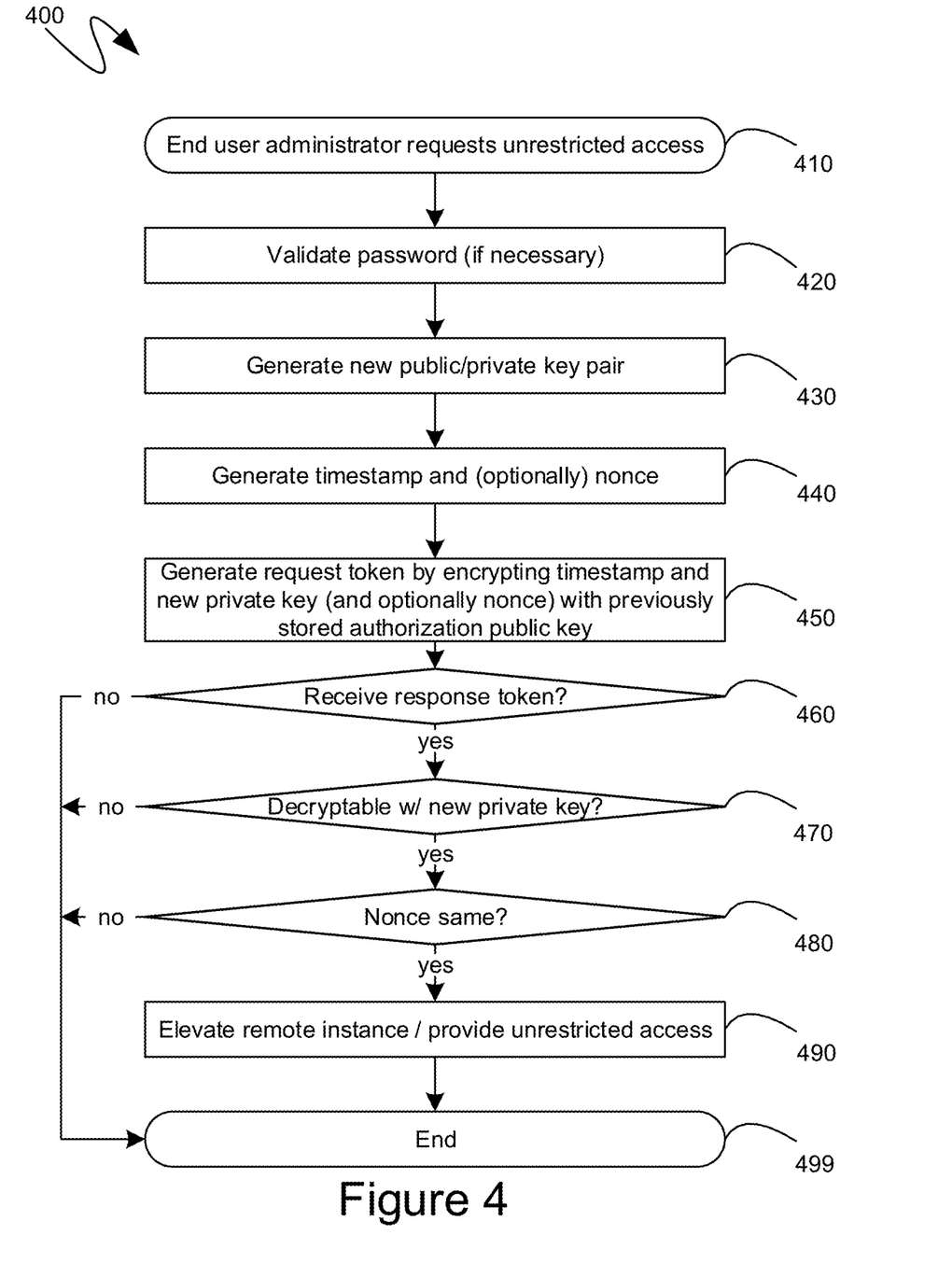
FIG. 4 is a flow diagram of an exemplary series of steps by which elevated access can be provided.

Turning to FIG. 4, the flow diagram 400 shown therein illustrates an exemplary series of steps, such as can be performed by the aforementioned elevate function, are illustrated. Initially, as shown, at step 410, an end-user administrator can request that a remote instance into a command line or other like functional interface be elevated to allow for unfettered administrator privileges. As indicated, such a request can be made through a allowed function and, as indicated previously, an optional password may be required, which can be validated at step 420, if necessary. Subsequently, at step 430, a new public/private key pair can be generated. Additionally, a timestamp, and, optionally, a nonce can also be generated, such as at step 440. A request token, such as that detailed previously, can then be generated at step 450 by encrypting the timestamp and the newly generated public key, and, optionally, the nonce, with a previously stored authorization public key.

The receipt of a response token can monitored at step 460 and, as illustrated, if no such response token is received, the relevant processing can end at step 499. If, however, such a response token is received at step 460, processing can proceed to step 470 to determine whether the response token is decryptable with the newly generated private key. If the response token can be properly decrypted with the newly generated private key, then such a proper decryption can be an indication that the response token was properly formed, and processing can proceed. If, conversely, at step 470, it is determined that the response token cannot be properly decrypted with the newly generated private key, the relevant processing can, again, end at step 499. As an optional step, a further check can be made at step 480 to verify that the nonce received in the response token, if such a nonce was previously generated, and was included in the response token, is the same nonce as was previously generated. Again, if there is a discrepancy, the relevant processing can end at step 499. Conversely, if, at step 470, the decryptability of the response token and, optionally the equivalence of the nonce, at step 480, are verified, then the remote instance can be elevated to administrator access at step 490, thereby enabling the user to access functionality through it without being limited to allowed functions.

Figure 5:
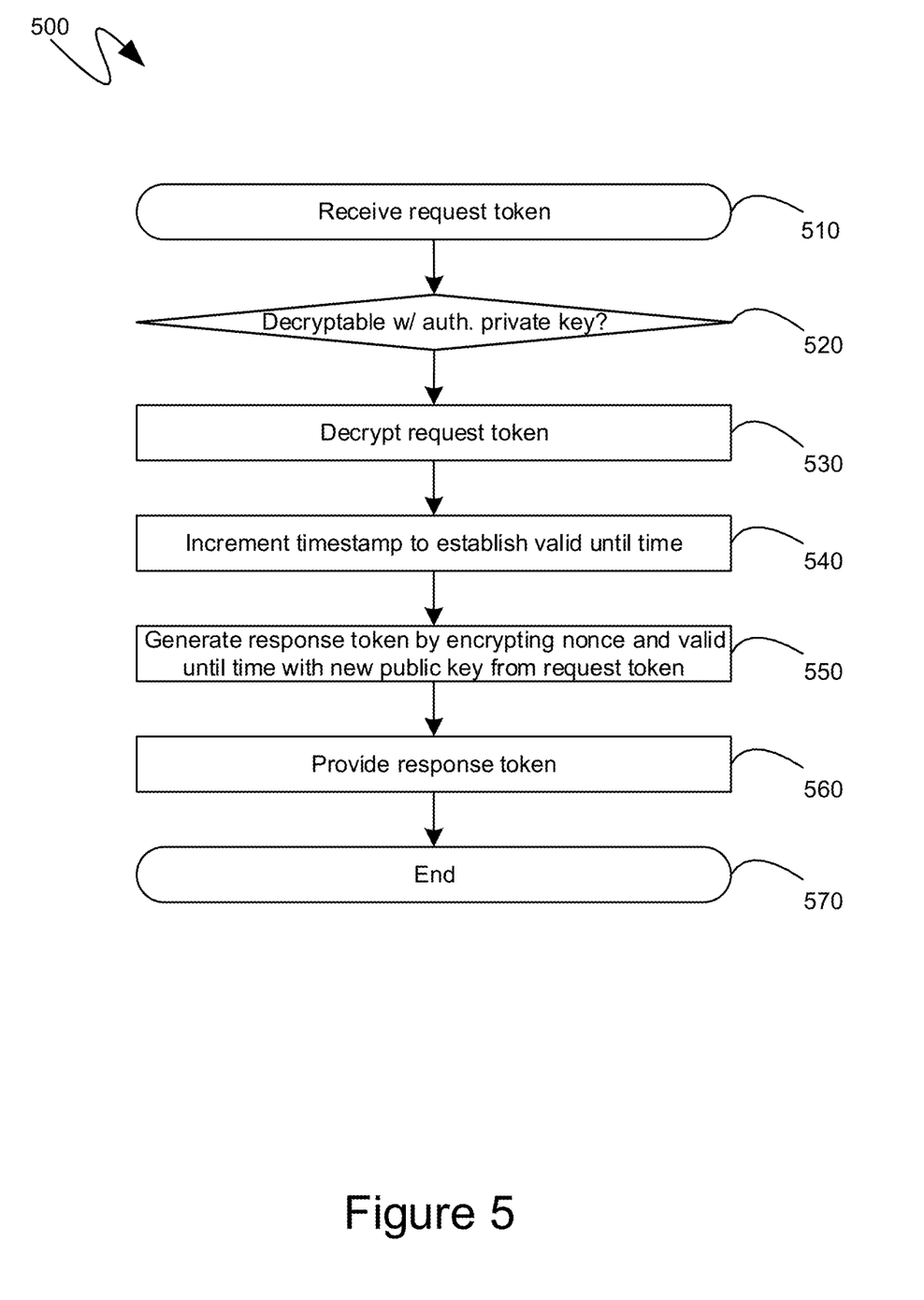
FIG. 5 is a flow diagram of another exemplary series of steps by which elevated access can be provided.

Turning to FIG. 5, the flow diagram 500 shown therein illustrates an exemplary series of steps that can be performed by the aforementioned authorize function, such as can be executed on one or more remote computing devices to which the users and administrators of the cloud infrastructure would not be allowed direct access. Initially, as illustrated, at step 510, request token can be received, such as in the form detailed above. A check can be made at step 520 as to whether such a request token is properly decryptable with the authorization private key that was separately retained since the generation of the authorization public/private key pair when the cloud infrastructure was packaged for distribution. If the request token is not able to be properly decrypted with the authorization private key, as determined at step 520, the relevant processing can end at step 570. Conversely, if the request token is able to be properly decrypted with the authorization private key, as determined at step 520, such a proper decryption can be evidence that the request token was properly generated. Subsequently, after decrypting the request token at step 530, the timestamp contained they are in can be incremented by a predetermined amount at step 540, including amounts that can be manually entered, such as by a customer support individual, or which can be dynamically determined processes executing in conjunction with the authorization process being described herein. An optional nonce, if present in the request token, can also be accessed upon the decryption of the request token. Also available, upon decryption of the request token, can be the newly generated public key described previously. Such a newly generated public key can be utilized to then encrypt the response token, which can contain the valid until time, obtained by incrementing the timestamp, and, optionally, the nonce and can be generated at step 550. Such a response token can then be provided at step 560 in response to the receipt of the request token, and the relevant processing can end at step 570.

Figure 6:
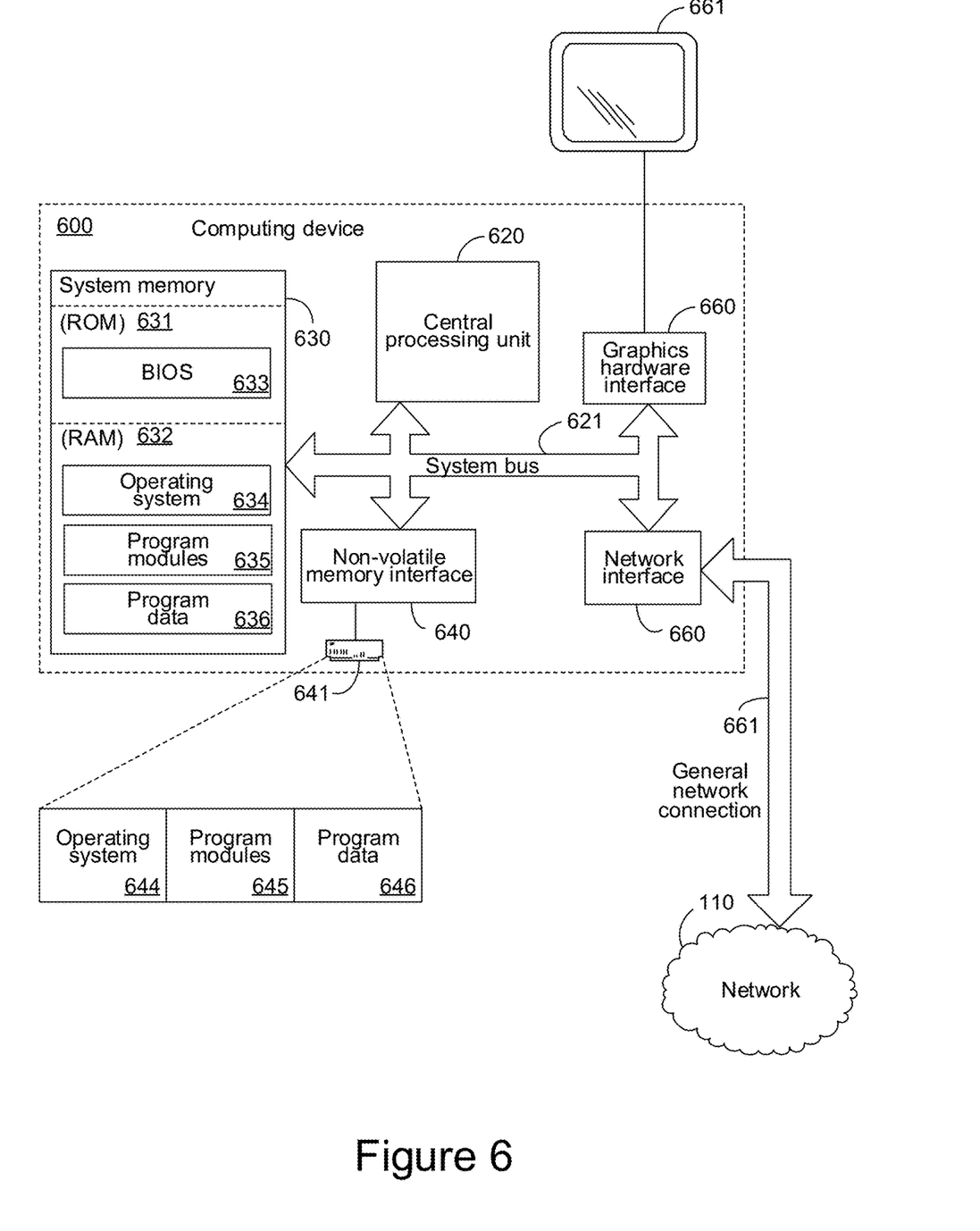
FIG. 6 is a block diagram of an exemplary computing device.

Turning to FIG. 6, an exemplary computing device 600 is illustrated which can perform some or all of the mechanisms and actions described above. The exemplary computing device 600 can include, but is not limited to, one or more central processing units (CPUs) 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, including, but not limited to, a graphics hardware interface 660 and a display device 661, which can include display devices capable of receiving touch-based user input, such as a touch-sensitive, or multi-touch capable, display device. Depending on the specific physical implementation, one or more of the CPUs 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 600. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer content between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, other program modules 635, and program data 636.

The computing device 600 may also include other removable/non-removable, volatile/nonvolatile computer storage media. By way of example only, FIG. 6 illustrates a hard disk drive 641 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 641 is typically connected to the system bus 621 through a non-volatile memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 may operate in a networked environment using logical connections to one or more remote computers. The computing device 600 is illustrated as being connected to the general network connection 661 through a network interface or adapter 660, which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 661. It will be appreciated that the network connections shown are exemplary and other means of establishing a communications link between computing devices may be used.

Although described as a single physical device, the exemplary computing device 600 can be a virtual computing device, in which case the functionality of the above-described physical components, such as the CPU 620, the system memory 630, the network interface 660, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 600 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

As can be seen from the above descriptions, mechanisms for increasing access to functionality of an otherwise sealed cloud computing infrastructure have been presented. In view of the many possible variations of the subject matter described herein, we claim as our invention all such embodiments as may come within the scope of the following claims and equivalents thereto.

We claim:

1. A set of one or more computing devices, in aggregate comprising:
    one or more processing units; and
    one or more computer-readable media comprising computer-executable instructions which, when executed by the one or more processing units, cause the set of computing devices to:
        instantiate an unelevated remote instance of an administrative interface through a defined endpoint of the administrative interface, the defined endpoint having associated with it a first set of functions that are provided by a cloud computing infrastructure and are invocable through the unelevated remote instance of the administrative interface and a second set of functions that are also provided by the cloud computing infrastructure but are not invocable through the unelevated remote instance of the administrative interface;
        receive, through the unelevated remote instance of the administrative interface, an invocation of an elevate function, the elevate function being in the first set of functions;
        generate, by the elevate function, an external authorization request token;
        receive, by the elevate function, an external authorization response token corresponding to the external authorization request token; and
        elevate, by the elevate function, the unelevated remote instance of the administrative interface into an elevated remote instance of the administrative interface in response to validating the external authorization response token;
        wherein the second set of functions are invocable through the elevated remote instance of the administrative interface.

2. The set of computing devices of claim 1, wherein the one or more computer-readable media comprise further computer-executable instructions which, when executed by the one or more processing units, cause the set of computing devices to:
    display a first multi-character alphanumeric string associated with the external authorization request token;
    wherein the receiving the external authorization response token comprises receiving a second multi-character alphanumeric string entered by a user interacting with the unelevated remote instance of the administrative interface.

3. The set of computing devices of claim 2, wherein the one or more computer-readable media comprise further computer-executable instructions which, when executed by the one or more processing units, cause the set of computing devices to:
    encode the external authorization request token into the first multi-character alphanumeric string such that the first multi-character alphanumeric string has fewer characters than the external authorization request token.

4. The set of computing devices of claim 2, wherein the second multi-character alphanumeric string is provided to the user in response to the user communicating the first multi-character alphanumeric string to an external entity.

5. The set of computing devices of claim 1, wherein the invocation of the elevate function comprises provision of a password; and wherein further the generation of the external authorization request token is contingent upon local validation of the password.

6. The set of computing devices of claim 1, wherein the one or more computer-readable media comprise further computer-executable instructions which, when executed by the one or more processing units, cause the set of computing devices to:
    de-elevate, by the elevate function, the elevated remote instance of the administrative interface into the unelevated remote instance of the administrative interface in response to a time limit being exceeded.

7. The set of computing devices of claim 6, wherein the external authorization response token comprises an indication of the time limit.

8. The set of computing devices of claim 7, wherein the time limit is based on a timestamp that is part of the external authorization request token.

9. A method comprising:
instantiating, on an end user administrator computing device, an unelevated remote instance of an administrative interface through a defined endpoint of the administrative interface, first set of functions that are provided by a cloud computing infrastructure and are invocable through the unelevated remote instance of the administrative interface and a second set of functions that are also provided by the cloud computing infrastructure but are not invocable through the unelevated remote instance of the administrative interface;
invoking an elevate function through the unelevated remote instance of the administrative interface, the elevate function being in the first set of functions;
receiving, in response to the invocation of the elevate function, a first multi-character alphanumeric string displayed on a display device communicationally coupled to the end user administrator computing device;
providing, to the elevate function, a second multi-character alphanumeric string in response to the display of the first multi-character alphanumeric string; and
elevating the unelevated remote instance of the administrative interface into an elevated remote instance of the administrative interface based on the second multi-character alphanumeric string;
wherein the second set of functions are invocable through the elevated remote instance of the administrative interface.

10. The method of claim 9, further comprising:
generating an external authorization request token; and
encoding the external authorization request token into the first multi-character alphanumeric string such that the first multi-character alphanumeric string has fewer characters than the external authorization request token.

11. The method of claim 9, further comprising:
providing the first multi-character alphanumeric string to a support entity in a first message directed to the support entity; and
receiving, in response, from the support entity, a second message comprising the second multi-character alphanumeric string.

12. The method of claim 9, wherein the invoking the elevate function comprises providing a password; and wherein further the display of the first multi-character alphanumeric string is contingent upon locally validating the password.

13. The method of claim 9, further comprising:
de-elevating the elevated remote instance of the administrative interface into the unelevated remote instance of the administrative interface in response to a time limit being exceeded.

14. A system comprising:
one or more support computing devices, in aggregate comprising: one or more support computing device processing units; and one or more support computing device computer-readable media comprising computer-executable instructions which, when executed by the one or more support computing device processing units, cause the set of one or more support computing devices to:
receive an external authorization request token; and
generate an external authorization response token in response to the external authorization request token; and one or more computer-readable storage media comprising computer-executable instructions which, when installed on one or more end user server computing devices and then executed by one or more end user server processing units, cause the one or more end user server computing devices to provide a cloud computing infrastructure performing steps comprising:
instantiate an unelevated remote instance of an administrative interface through a defined endpoint of the administrative interface, the defined endpoint having associated with it a first set of functions that are provided by the cloud computing infrastructure and are invocable through the unelevated remote instance of the administrative interface and a second set of functions that are also provided by the cloud computing infrastructure but are not invocable through the unelevated remote instance of the administrative interface;
receive, through the unelevated remote instance of the administrative interface, an invocation of an elevate function, the elevate function being in the first set of functions;
generate, by the elevate function, the external authorization request token;
receive, by the elevate function, the external authorization response token; and
elevate, by the elevate function, the unelevated remote instance of the administrative interface into an elevated remote instance of the administrative interface in response to validating the external authorization response token;
wherein the second set of functions are invocable through the elevated remote instance of the administrative interface.

15. The system of claim 14, wherein the cloud computing infrastructure performs further steps comprising:
display a first multi-character alphanumeric string associated with the external authorization request token; and
wherein further the receiving, by the one or more support computing devices, of the external authorization request token comprises receiving the first multi-character alphanumeric string.

16. The system of claim 15, wherein the cloud computing infrastructure performs further steps comprising:
encode the external authorization request token into the first multi-character alphanumeric string such that the first multi-character alphanumeric string has fewer characters than the external authorization request token.

17. The system of claim 14, wherein the one or more support computing device computer-readable media comprise further computer-executable instructions which, when executed by the one or more support computing device processing units, cause the set of one or more support computing devices to:
encode the external authorization response token into a second multi-character alphanumeric string such that the second multi-character alphanumeric string has fewer characters than the external authorization response token; and
display the second multi-character alphanumeric string;
wherein further the receiving, by the elevate function, of the external authorization response token comprises receiving the second multi-character alphanumeric string.

18. The system of claim 14, wherein an end user administrator of the end user server computing devices messages the external authorization request token to a customer service representative utilizing the one or more support computing devices.

19. The system of claim 14, wherein the invocation of the elevate function comprises provision of a password; and wherein further the generation of the external authorization request token is contingent upon validation of the password by the cloud computing infrastructure.

20. The system of claim 14, wherein the cloud computing infrastructure performs further steps comprising:
   de-elevate, by the elevate function, the elevated remote instance of the administrative interface into the unelevated remote instance of the administrative interface in response to a time limit being exceeded.

\* \* \* \* \*